April 21, 1931.  J. J. McLAUGHLIN  1,801,442
PACKING FOR CLOSURES
Filed Aug. 28, 1929

Inventor,
James J. McLaughlin.
Attorney

Patented Apr. 21, 1931

1,801,442

UNITED STATES PATENT OFFICE

JAMES JOSEPH McLAUGHLIN, OF FAIRFIELD, CONNECTICUT, ASSIGNOR TO E. I. DU PONT DE NEMOURS & COMPANY, OF WILMINGTON, DELAWARE, A CORPORATION OF DELAWARE

PACKING FOR CLOSURES

Application filed August 28, 1929. Serial No. 388,973.

This invention relates to packings. More specifically it relates to sealing devices designed to hermetically and thermetically seal closures. Still more specifically it relates to the provision of a packing of a new and extremely useful kind for refrigerator doors.

Most refrigerators today are equipped with a rubber gasket strip which is applied to a refrigerator door by means of tacks or nails. In another case, I have heard of an extruded or molded type gasket which is applied to the refrigerator door by snapping it in place. In this case the gasket is constructed with small button like projections which fit into the door.

An object of the invention is the provision of means for attaching a gasket to a closure which will permit the ready removal of the gasket and substitution of another gasket without necessitating the removal or disturbance of the attaching device. Another object of the present invention is to provide a refrigerator door which will permit the easy insertion of a suitably prepared gasket. A further object is to provide a gasket which will eliminate the necessity of tacking the gasket to the door. Another object is to provide a gasket which will give greater insulating quality to the refrigerator because of the reduction in the extent of leakage due to inferior sealing. A still further object is to provide a gasket which will have the insulating properties of the tacked variety of gasket material and yet will be easily applied and removed from the refrigerator. Other objects will be in part obvious and are in parts hereinafter pointed out.

These objects are accomplished, generally speaking, by the provision of a clip designed to hold a strip, gasket, or packing in place on a refrigerator door. They are further accomplished by the provision of a gasket constructed in a manner specifically designed to co-operate with the said clip and to effect a continuous and complete seal of the closure.

Figure 1:
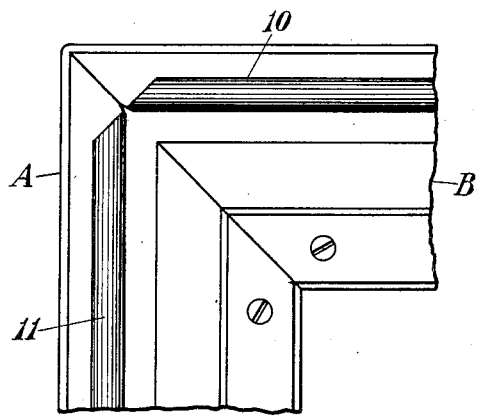
Figure 2:
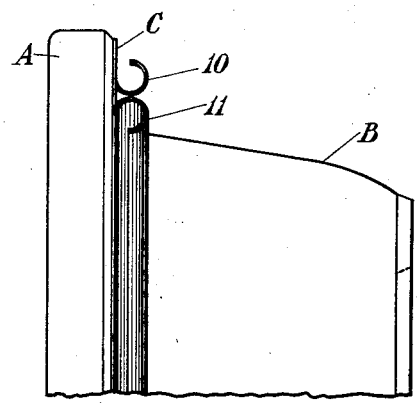
Figure 3:
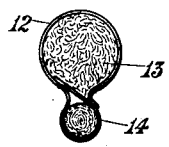
Figure 4:
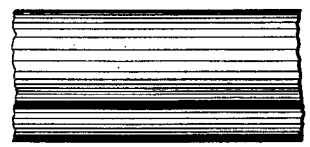
Figure 5:
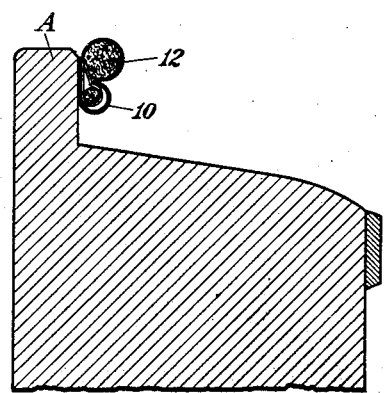

In the drawings Figure 1 is a side elevational view of an inside corner of the refrigerator door. Figure 2 is an end elevational view of the door corner showing the gasket channel. Figure 3 is a cross sectional view of the gasket. Figure 4 is a plan view of a portion of the gasket. Figure 5 shows the gasket in place in a channel mounted on a closure.

It will be apparent that closures, for example, refrigerator closures, are composed of an opening in the refrigerator and a closure therefor, both opening and closure having co-operating faces designed to prevent the ingress of heat and air. The invention consists in providing a packing for these co-operating faces which increases the efficiency of the refrigerator by excluding to a greater extent the ingress of heat. The closure A, which for example is illustrated as the door of a refrigerator having thickened portion B, is provided with channel strips 10—11 which substantially circumscribe the co-operating face to which they are attached, and which are designed to hold a packing gasket.

This channel may be constructed in several ways, as by fixing by one edge a strip of metal to the refrigerator door and bending the other edge over, or by the forming of the edge of the metallic sheathing found in some refrigerators into a substantially U shape. This clip or channel may be either of spring material or otherwise, and may be either in several pieces or in one piece.

The packing gasket to co-operate with this holding device is preferably composed of a strip of material capable of circumscribing the co-operating face to which it is to be attached, and may be longitudinally divided into two sections separated one from another by a channel. This is illustrated in Figure 3 of the drawings. One of these sections may be of larger cross sectional diameter than the other to prevent contact of the channel and the other co-operating face. The specific form of this packing shown in the drawings is composed of a strip of cloth 12 made of suitable gasket material, such as rubberized fabric, or pyroxylin coated, or oil coated fabrics, which is formed at one side into a small loop 14 designed to hold a cord of relatively non-resilient material and at the other side is formed into a larger loop 13 designed to hold a larger amount of relatively resilient material. A paper cord filler is suitable for the relatively non-resilient part, which is designed to co-operate with the channel, and cotton filler is suitable for filling the section 13 which is designed to perform the sealing function.

The advantages of this type of attachment and gasket are that they allow the insertion of the gasket without any special tools after the refrigerator is completed, that the gasket can be inserted without danger of damaging the enamel of the box or door, that because gaskets soil easily and are not readily cleanable, and since they are not serviceable for the life of the box, it is decidedly advantageous to have a gasket which can be replaced easily, and that better sealing is obtained because in the type gasket commonly used in refrigerators the gasket is tacked to the door and permits leakage between the gasket and the back of the door, as well as leakage that occurs at the seal effected by the gasket itself. When the type gasket described in this invention is used, the leakage is reduced more than half because there is a perfect seal where the gasket fits into the channel and no air can enter the refrigerator between the gasket and the door to which the gasket is applied.

It will be apparent that although a specific method of accomplishing this result has been illustrated that innumerable variations, such as the substitution of a rubber gasket for a filled-fabric gasket, changes in location, in shape of channel and gasket, and innumerable others that will occur to persons skilled in the art. Consequently the invention is not to be deemed limited except by the appended claims.

I claim:

1. In a device of the character described a closure, a spring clip carried by the closure, and packing held by the resilience of the clip.

2. In a sealing device for co-operating with faces of refrigerator closures, resilient channels substantially circumscribing the periphery of one of said faces and designed to retain a packing strip.

3. Means for attaching a gasket to a closure comprising a strip of spring metal fastened at one edge to said closure and bent thence in a substantially U shape to its other edge, and designed by its resilience to hold a gasket between said U shaped portion and said closure.

4. A packing strip, for cooperation with a spring clip having a longitudinal raised ridge which is resistant to compression and a longitudinally raised ridge which is compressible.

5. A packing strip comprising a fabric tube longitudinally divided into pockets of unequal size one of which is stuffed with a substance resistant to compression and the other of which is stuffed with a resilient substance.

6. A packing strip comprising a fabric tube longitudinally divided into stuffed pockets of unequal size, the larger of which is stuffed with a resilient substance and the smaller of which is stuffed with a substance of relatively slight resilience.

7. A refrigerator having an opening and a closure therefor, the said refrigerator and closure having cooperating faces, one of which has a metallic facing an edge of which is of spring material bent to hold a gasket.

In testimony whereof, I affix my signature.

JAMES JOSEPH McLAUGHLIN.